SUPER-CHARGED FIRE JET TORQUE AND PROPULSION REACTION ENGINE
Filed Sept. 15, 1961 2 Sheets-Sheet 1
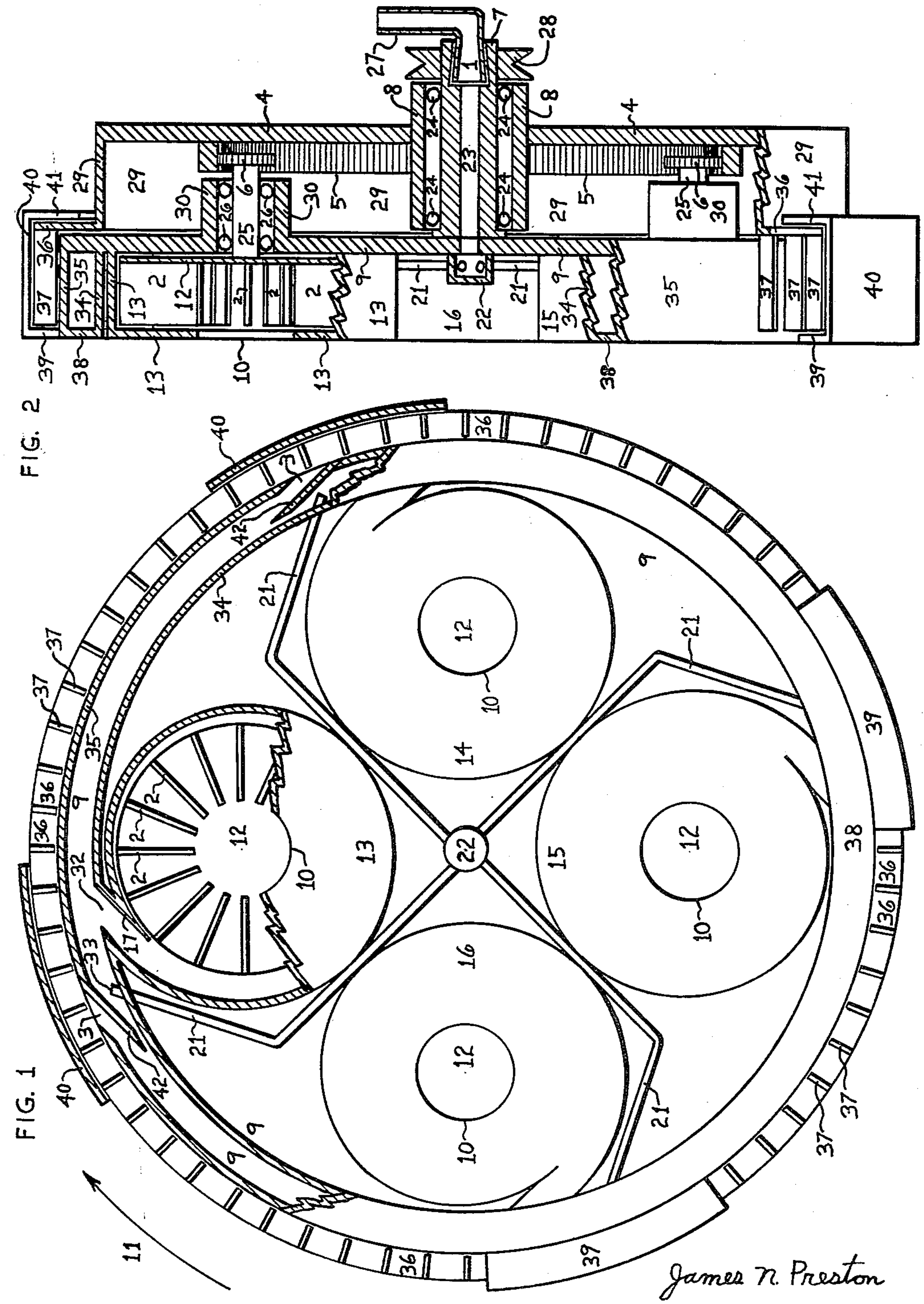

June 11, 1963 J. N. PRESTON 3,092,967
SUPER-CHARGED FIRE JET TORQUE AND PROPULSION REACTION ENGINE
Filed Sept. 15, 1961 2 Sheets-Sheet 2
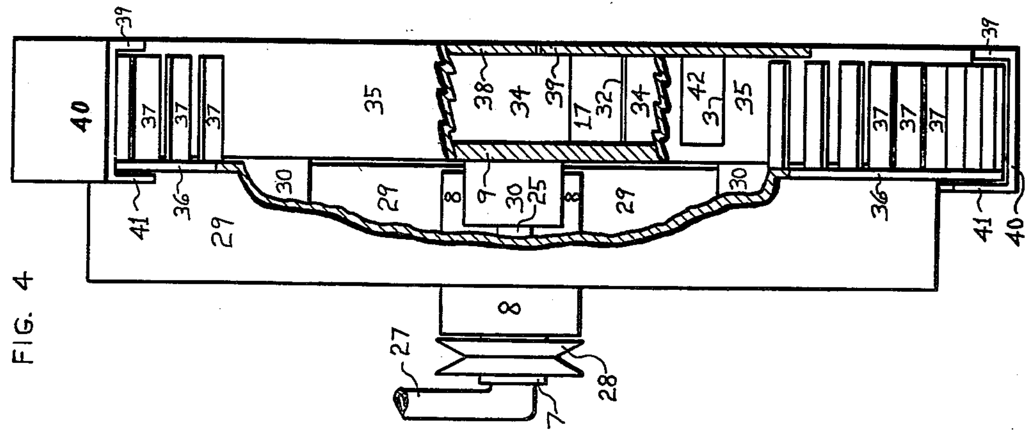
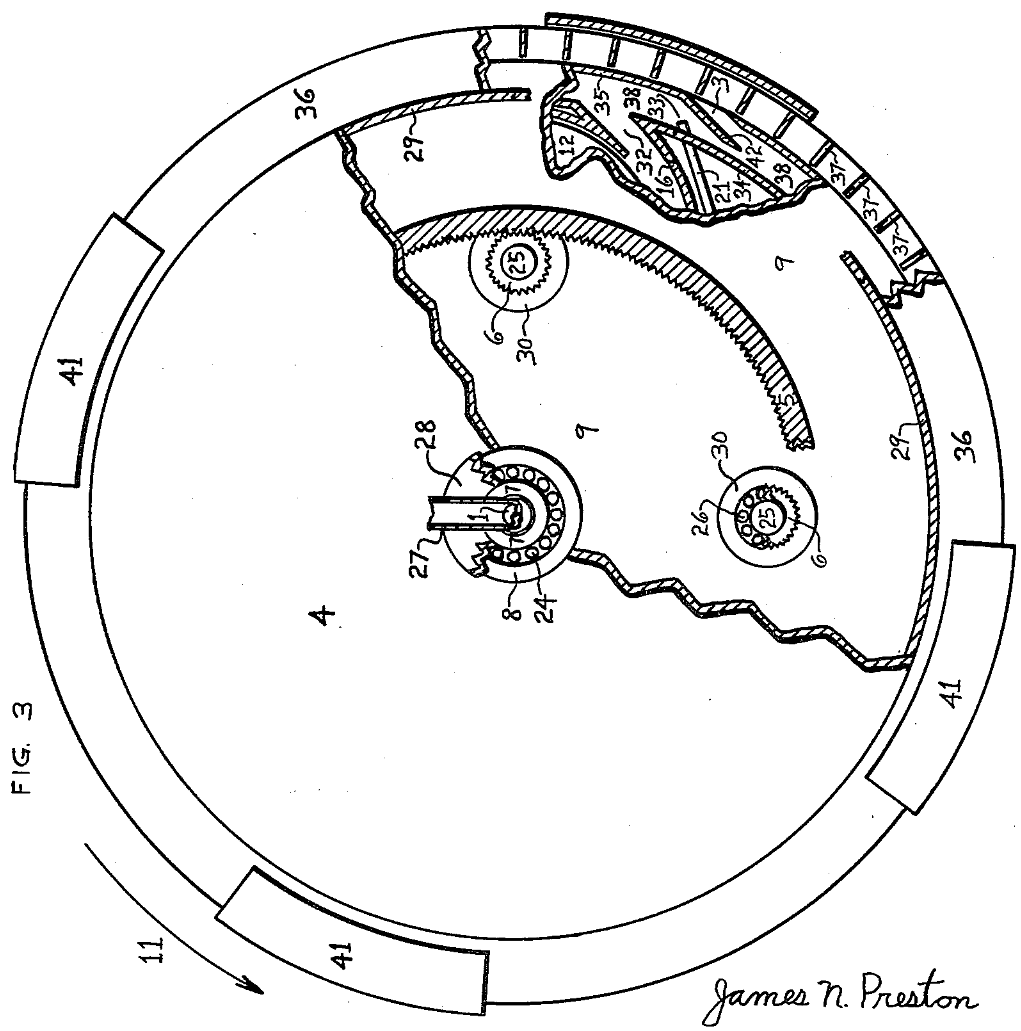
James N. Preston United States Patent Office 3,092,967

Patented June 11, 1963

3,092,967

SUPER-CHARGED FIRE JET TORQUE AND PROPULSION REACTION ENGINE

James N. Preston, 1633 W. Campbell, Phoenix, Ariz.

Filed Sept. 15, 1961, Ser. No. 138,362
3 Claims. (Cl. 60—39.35)

This invention is a modification and continuation-in-part of the invention entitled "Jet Torque and Propulsion Reaction Engine" of application Serial No. 109,606, filed May 12, 1961, now Patent No. 3,065,600, with the improvement being in the air compressor which consists of a number of smaller planetary centrifugal type air compressors replacing the former single centrifugal type air compressor. This arrangement forces many times as much air per revolution into the combustion chamber than did the previous single type air compressor and thus greatly increases its torque and thrust per revolution of the main axle.

This engine also employs an improved form of the combustion exhaust gas back-pressure assembly of the aforementioned application Serial No. 109,606 which makes it an extremely efficient design.

FIGURE 1 shows the front view of the engine with part of one planetary air compressor, combustion chamber, and back-pressure assembly cut away.

FIGURE 2 shows the adjacent right side view of the engine when the front view is rotated 90 degrees to its right on its vertical axis and has part of one planetary air compressor, the combustion chamber, the back-pressure assembly, ring gear and other parts cut away.

FIGURE 3 shows the rear view of the engine when the front view is rotated 180 degrees to its right on its vertical axis and shows part of the back-pressure assembly, combustion chamber, ring gear, combustion chamber, and power take-off pulley cut away.

FIGURE 4 shows the adjacent left side view of the engine when the front view is rotated 270 degrees to its right on its vertical axis with part of the back-pressure assembly and combustion chamber cut away.

Referring to the drawing in more detail, 9 indicates the center disc which is affixed at its radial center to the center of the right circular end of the axle 7 and revolves counter-clockwise with said axle 7 in a plane perpendicular to the axis of said axle 7 on the bearings 24 within the stationary hub 8.

The combustion chamber is contained on one side by the face of the center disc 9 adjoining the periphery of said center disc 9. The right circular combustion outer cylinder 35 is affixed at one end to the periphery of said center disc 9 and extends on a line perpendicular from the face of said center disc 9 to a line in a plane which is parallel to said center disc 9 and on the side of the center disc 9 opposite to that of the axle 7. The axis-toward side of the combustion chamber is contained by the right circular combustion inner cylinder 34 which has a somewhat smaller radius than that of the combustion outer cylinder 35 and extends on a line perpendicular from the face of the center disc for the same distance as does the combustion outer cylinder 35. The combustion ring disc 38 is affixed at its adjacent face to the adjacent right circular end of the combustion outer cylinder 35 and extends to the combustion inner cylinder 34 to seal the combustion chamber which is air-tight except for a number of combustion air intake ports 32 cut through the combustion inner cylinder 34, a number of combustion exhaust ports 3 cut through the combustion outer cylinder 35, and the fuel intake jets 33.

A number of planetary centrifugal type air compressors 13, 14, 15, and 16 are affixed to the face of the center disc 9 on the same side as is the combustion chamber with each one being equidistant from the axis of the axle 7 and closely adjacent to the combustion inner cylinder 34 of the combustion chamber. The rotor 12 of each planetary air compressor rotates clockwise 11 in a plane parallel to the closely parallel adjacent center disc 9; each said rotor 12 being affixed at its radial center to a planetary axle 25 which extends parallel to the main axle 7, through the center disc 9 and rotates on the ball bearings 26 within a planetary hub 30 which is affixed to the opposite face of the center disc 9.

The rotor blades 2 affixed to the face of each rotor 12 within each planetary air compressor forces air entering each compressor air intake port 10 outward by centrifugal force through the combustion air intake port 32 into the adjacent combustion chamber.

Fuel is pumped into the combustion chamber in the vicinity of each combustion air intake port 32 at each fuel intake jet 33 which is supplied through a fuel pipe 21 leading from the fuel distributor cup 22, the axle core 23, and the swing joint 1 of the stationary fuel pipe 27.

The ignited and expanding gases within the combustion chamber is allowed to escape at each combustion exhaust port 3 which is located on the adjacent counter-clockwise side of each combustion air intake port 32. The combustion exhaust baffle 42, extending perpendicular from the face of the center disc 9 to the ring disc 38, is affixed to the outer combustion cylinder 35 within the clockwise 11 side of each combustion exhaust port 3 and extends in a counter-clockwise direction into the combustion chamber for a distance on a line that is tangent to the inner combustion cylinder 34 in order to allow the combustion exhaust gases to exhaust from each combustion exhaust port 3 in a clockwise 11 tangent direction. The reaction of the combustion exhaust gases exhausting in a clockwise 11 tangent direction forces the center disc 9 and assembly to rotate in a counter-clockwise direction. Torque power is transmitted through the pulley 28 which is affixed to the axle 7.

When the center disc 9 and assembly rotate in a counter-clockwise direction, the rotor 12 of each affixed planetary air compressor is turned in a clockwise 11 direction by a planetary gear which is centered and affixed to the opposite end of its planetary axle 25. Each said planetary gear 6 is in mesh with the stationary ring gear 5 which is centered around, and held in a plane perpendicular to, the axis of the axle 7 by the affixed back-pressure disc 7 which is affixed to the periphery of the stationary hub 8.

The combustion exhaust gases exhausting from the combustion chamber are prevented from freely entering the atmosphere by a back-pressure assembly which increases the power of the engine many times. A number of radial back-pressure vanes 37 are affixed perpendicular to the face of a back-pressure ring disc 36 which is closely adjacent to the center disc 9 on the side opposite to the combustion chamber. Said back-pressure ring disc 36 extends from a radius generally equal to that of the combustion inner cylinder 34 to a radius somewhat greater than that of the combustion outer cylinder 35 and held in place by the affixed back-pressure support cylinder 29 extending from the periphery of the back pressure disc 4. The radial back-pressure vanes 37 extend perpendicular from the face of the back-pressure ring disc 36 across the closely parallel adjacent periphery of the combustion outer cylinder 35 and extend for a distance on a radial line to a radius equal to that of the back-pressure ring disc 36.

The back-pressure housing extending for a distance on the clockwise 11 and counter-clockwise side of each combustion exhaust port 3 completes the back-pressure assembly. A back-pressure cylinder segment 40 is closely adjacent to the outer edges of the back-pressure vanes 37 and is held in place by the back-pressure ring segment 39 extending from the periphery of the combustion outer cylinder 35 and also closely adjacent to the back-pressure vanes 37. The second ring segment 41, closely parallel adjacent to the outside face of the back-pressure ring disc 36, is affixed to the adjacent side of the back-pressure cylinder segment 40 and extends for a distance toward the back-pressure support cylinder 29.

I claim:

1. A reaction engine comprising; a combustion chamber contained within a combustion outer cylinder by means of a combustion ring disc which concentrically adjoins one end of said combustion outer cylinder and a center disc which concentrically adjoins the opposite end of said combustion outer cylinder; said combustion chamber contained on its axis-toward side by means of a concentric combustion inner cylinder which concentrically adjoins said combustion ring disc and said center disc; said combustion chamber provided with a number of combustion air intake ports located generally in the combustion inner cylinder; said combustion chamber provided with a number of combustion exhaust ports located generally in the combustion outer cylinder; each combustion exhaust port provided with a substantially larger cross-section area than that of each combustion air intake port; the combustion chamber provided with at least one fuel intake jet located generally in the combustion inner cylinder; an axle located concentric with the combustion outer cylinder and concentrically affixed to the center disc and which rotates on bearings within a stationary hub; a back-pressure disc affixed axially concentric to said stationary hub; a plurality of radial back-pressure vanes; each radial back-pressure vane being in connection with the back-pressure disc and extending in a general axial direction for a distance generally across the plane of the combustion chamber closely adjacent generally to the periphery of the combustion outer cylinder; each said back-pressure vane extending outward for a distance in a radial direction from an axially concentric perimeter which is provided with a diameter generally larger than that of the periphery of the combustion outer cylinder; a number of generally centrifugal-type axle-driven planetary air compressors connected to the center disc and located generally at a distance from the axis of the axle; the planetary axle of each said planetary air compressor being rotatable around its axis by means of a suitable torque transmission train, generally a gear train, which gears the planetary axle of each said planetary air compressor to the stationary hub and its assembly for the purpose of rotating each said planetary axle at a higher r.p.m. velocity than that of the axle thereby activating each planetary air compressor to compress expandable fluid, generally air, continuously through each combustion air intake port into the combustion chamber when the center disc and its assembly are rotated around the axis of the axle; thermal energy provided within the combustion chamber for the purpose of providing said fluid therein with a substantially larger fluid volume therein by means of fluid expansion thereby providing a fluid exhaust velocity and p.s.i. pressure to said larger fluid volume at each combustion exhaust port to a degree approaching the intake fluid velocity and p.s.i. pressure of compressed fluid within each combustion air intake port prior to entering said combustion chamber; any combustible fuel being forced generally by pump means through the fuel intake jet into said combustion chamber wherein said fuel is ignited by ignition means to compressed fluid, generally compressed air, thereby providing thermal energy and a larger fluid volume therein; the larger fluid volume consisting generally of ignited and expanding combustion gases and continuously exhausting from the combustion chamber through at least one combustion exhaust port generally directly into the plane and influence of the radial back-pressure vanes generally from the axis-toward side of said radial back-pressure vanes; a means located generally within the combustion chamber for the purpose of directing the exhausting larger fluid volume from said combustion chamber and each combustion exhaust port in a general axially transverse direction and generally directly into the plane and influence of the radial back-pressure vanes in a general tangent general axially transverse direction generally from the axis-toward side of said radial back-pressure vanes; the continuous exhausting of the larger fluid volume from the combustion chamber at each combustion exhaust port providing a continuous reaction pressure which rotates each said combustion exhaust port, combustion chamber assembly, and planetary air compressors around the axis of the axle and activates the planetary axle of each said planetary air compressor by torque-transmission means thereby providing continuous compression of fluid into the combustion chamber thereby continuing the cycle providing continuous torque energy and propulsion thrust from thermal energy; said exhausting larger fluid volume thereupon impinging against a surface area of each radial back-pressure vane in the path of said exhausting larger fluid volume which provides a fluid back-pressure against said exhausting larger fluid volume and each combustion exhaust port of the combustion chamber thereby providing a substantial increase in the torque energy of the engine over the torque energy of a simple reaction engine.

2. The invention as claimed in claim 1 wherein an axially concentric back-pressure means provided which includes rotating and stationary back-pressure walls enclosing the plane and influence of the radial back-pressure vanes; each respective back-pressure wall located closely adjacent or adjoining to each respective side of the plane and influence of the radial back-pressure vanes for the purpose of substantially containing the exhausting larger fluid volume within the plane and influence of the radial back-pressure vanes for an arc distance extending from the vicinity of each combustion exhaust port thereby providing continuous fluid p.s.i. back-pressure between each said combustion exhaust port of the combustion chamber and adjacent radial back-pressure vanes to a degree approximately equal to fluid p.s.i. pressure of said larger fluid volume within said combustion chamber which causes each combustion exhaust port and the combustion chamber assembly to rotate around the axis of the axle with a degree of reaction torque energy proportional to the cross-section surface area of each radial back-pressure vane and to the degree of fluid p.s.i pressure, volume, and velocity of said exhausting larger fluid volume from each combustion exhaust port of the combustion chamber; an axially concentric normally segmented back-pressure cylinder provided which extends across the plane of the radial back-pressure vanes and located closely adjacent generally to the periphery of the plane and influence of said radial back-pressure vanes; an axially concentric normally segmented back-pressure ring provided which concentrically adjoins said normally segmented back-pressure cylinder and which provides a back-pressure wall of said back-pressure means located closely adjacent to a side of the plane and influence of said back-pressure vanes; said back-pressure means including an axially concentric cylinder which being in connection with the center disc and which extends across the plane of the radial back-pressure vanes and which provides a back-pressure wall located closely adjacent generally to the axis-toward side of the back-pressure vanes and which adjoins said axially concentric normally segmented back-pressure ring; the combustion outer cylinder functioning generally as both the peripheral containing wall of the combustion chamber and said axis-toward back-pressure wall of said back-pressure means; an axially concentric back-pressure ring disc provided which being in connection with the back-pressure disc and which provides a back-pressure wall of said back-pressure means located on a side adjoining to said radial back-pressure vanes; an axially concentric normally segmented second back-pressure ring provided which concentrically adjoins the normally segmented back-pressure cylinder and which provides a back-pressure wall located in a plane adjacent to said back-pressure ring disc; each combustion exhaust port providing entrance means for the exhausting larger fluid volume from the combustion chamber to flow generally directly into the back-pressure means in a general axially transverse direction generally from the axis-toward side of the said back-pressure means and tangentially into the plane and influence of the back-pressure vanes; at least one of the aforesaid back-pressure walls of the back-pressure means being segmented for the purpose of providing exhaust means for said larger fluid volume from within the back-pressure means and the plane and influence of the radial back-pressure vanes normally into the atmosphere after an arc distance of containment therein from each combustion exhaust port thereby continuing the cycle which provides continuous torque energy and propulsion thrust from thermal energy.

3. The invention as claimed in claim 1 wherein the combustion chamber provided with at least one combustion air intake port located generally in the combustion inner cylinder; said combustion chamber provided with at least one combustion exhaust port located generally in the combustion outer cylinder; said combustion chamber provided with at least one axle-driven generally centrifugal-type planetary air compressor which being in connection with the center disc; the axle being in connection with the center disc and located generally concentric with the combustion outer cylinder; a reversible action provided wherein the combustion chamber assembly and the axle being allowed to remain stationary and the stationary hub and assembly being allowed to rotate around the axis of the axle; the larger fluid volume consisting normally of ignited and expanding combustion gases which exhaust from the combustion chamber through the combustion exhaust port generally directly into the plane and influence of the radial back-pressure vanes generally from the axis-toward side of said radial back-pressure vanes; a means provided located generally within the combustion chamber for the purpose of directing the exhausting larger fluid volume from said combustion chamber and the combustion exhaust port in a general axial transverse direction and generally directly into the plane and influence of the radial back-pressure vanes in a general tangent general axially transverse direction generally from the axis-toward side of said radial back-pressure vanes whereupon said larger fluid volume impinging against a surface area of each radial back-pressure vane in the path of said exhausting larger fluid volume which provides said radial back-pressure vanes and hub assembly with continuous rotation around the axis of the axle thereby providing torque energy which provides rotation to the planetary axle of the planetary air compressor by torque transmission means which provides continuous compression of fluid through the combustion air intake port into the combustion chamber thereby continuing the cycle providing continuous torque energy and propulsion thrust.

References Cited in the file of this patent

UNITED STATES PATENTS

| | | |
|---|---|---|
| 2,448,972 | Gizara | Sept. 7, 1948 |
| 2,594,629 | Exner | Apr. 29, 1952 |